United States Patent
Niver et al.

(10) Patent No.: US 7,343,432 B1
(45) Date of Patent: Mar. 11, 2008

(54) MESSAGE BASED GLOBAL DISTRIBUTED LOCKS WITH AUTOMATIC EXPIRATION FOR INDICATING THAT SAID LOCKS IS EXPIRED

(75) Inventors: Brett D. Niver, Grafton, MA (US); Steven R. Chalmer, Auburndale, MA (US); Steven T. McClure, Northboro, MA (US)

(73) Assignee: EMC Corporation, Hopkinton, MA (US)

( * ) Notice: Subject to any disclaimer, the term of this patent is extended or adjusted under 35 U.S.C. 154(b) by 914 days.

(21) Appl. No.: 10/666,773

(22) Filed: Sep. 19, 2003

(51) Int. Cl.
*G06F 13/00* (2006.01)
*G06F 13/28* (2006.01)
*G06F 17/30* (2006.01)

(52) U.S. Cl. .............................. 710/36; 710/37; 710/38; 711/118; 711/150; 711/202; 709/210; 709/213; 709/216

(58) Field of Classification Search ............. 710/36–38, 710/200; 711/118, 150, 202; 709/210, 213, 709/216
See application file for complete search history.

(56) References Cited

U.S. PATENT DOCUMENTS

| | | | |
|---|---|---|---|
| 6,272,662 B1 * | 8/2001 | Jadav et al. ................ 714/805 |
| 6,353,836 B1 * | 3/2002 | Bamford et al. ............ 707/203 |
| 6,510,478 B1 * | 1/2003 | Jeffords et al. ............. 710/200 |
| 6,516,393 B1 * | 2/2003 | Fee et al. .................... 711/150 |
| 6,986,015 B2 * | 1/2006 | Testardi ...................... 711/202 |

* cited by examiner

*Primary Examiner*—Tammara Peyton
(74) *Attorney, Agent, or Firm*—Muirhead and Saturnelli, LLC

(57) ABSTRACT

Described is a distributed lock processing technique that may be used to coordinate access to globally accessed resource between endpoints using the connecting message fabric. Processors in a data storage system communicate using the message switch of the message fabric. Each processor is an endpoint within a data storage system. Each endpoint, prior to requesting a lock, dynamically determines a current lock owner of the lock to be requested in accordance with a determination of which endpoints are available as lock owners at the current time. The lock request is issued to the current lock owner with a requested time period used by the lock owner to determine an expiration time. The lock expires automatically at the expiration time even if the lock holder becomes unavailable. If the current lock owner becomes unavailable, a new lock owner is determined prior to the next request for that lock.

43 Claims, 14 Drawing Sheets

MESSAGE BASED GLOBAL DISTRIBUTED LOCKS WITH AUTOMATIC EXPIRATION FOR INDICATING THAT SAID LOCKS IS EXPIRED

BACKGROUND

1. Technical Field

This application generally relates to a computer system, and more particularly to synchronization within the computer system.

2. Description of Related Art

Computer systems may include different resources used by one or more host processors. Resources and host processors in a computer system may be interconnected by one or more communication connections. These resources may include, for example, data storage devices such as the Symmetrix™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

Within a system, such as the Symmetrix™ data storage system, messages may be communicated between different components using a switch fabric. The switch fabric may include one or more switches arranged to permit transmissions of messages between different components or endpoints, such as processors or directors, included in a single Symmetrix system. Messages may also be referred to as frames and may include a header portion and a payload, such as data.

In a system, such as a data storage system with multiple endpoints, such as multiple directors, it may be necessary to synchronize access to resources accessed by one or more of the multiple endpoints. It may be desirable to perform this synchronization in an efficient manner and that the synchronization be performed without using global shared state.

SUMMARY OF THE INVENTION

In accordance with one aspect of the invention is a method for distributed lock management. A requesting node requesting a lock determines a current lock owner of the lock in accordance with an indicator specifying which one or more nodes are available as lock owners. A lock request message is sent to the current lock owner. The requesting node waits for an indication as to whether the lock request message has been granted or denied, and the determining is performed by the requesting node prior to the sending for each request.

In accordance with another aspect of the invention is a method for distributed lock management in a data storage system. A requesting node requesting a lock determines a current lock owner of the lock in accordance with an indicator specifying which one or more nodes are available as lock owners. A lock request message is sent to the current lock owner. The determining of a current lock owner is performed by the requesting node prior to the sending for each request.

In accordance with another aspect of the invention is a data storage system comprising: a plurality of processors which are endpoints in the data storage system; a message switch used by the plurality of processors to send transmissions, the transmissions including a lock request message and a lock response message; each of the plurality of processors including machine executable instructions on a computer readable medium for processing a lock request from the each processor to another processor that: determines, prior to sending a lock request message, a current lock owner in accordance with an indicator specifying which one or more of the plurality of processors are available as lock owners; and sending the lock request message to the current lock owner; and each of the plurality of processors including machine executable instructions on a computer readable medium for processing a received lock request message when the each processor is indicated as a lock owner by the indicator of another processor that sent said received lock request message that: determines whether a requested lock in accordance with the received lock request message is currently granted; granting to the requested lock to a requesting processor if the requested lock is not currently granted, and otherwise denying the requested lock to the requested node, wherein the lock owner determines an automatic expiration time in accordance with a requested lock time included in the received lock request message.

In accordance with yet another aspect of the invention is a computer program product for distributed lock management comprising: executable code that determines, by a requesting node requesting a lock, a current lock owner of the lock in accordance with an indicator specifying which one or more nodes are available as lock owners; and executable code that sends a lock request message to the current lock owner; and wherein the requesting node waits for an indication as to whether the lock request message has been granted or denied, and the executable code that determines is executed by the requesting node prior to executing the executable code that sends for each request.

In accordance with another aspect of the invention is a computer program product for distributed lock management in a data storage system comprising: executable code that determines, by a requesting node requesting a lock, a current lock owner of the lock in accordance with an indicator specifying which one or more nodes are available as lock owners; and executable code that sends a lock request message to the current lock owner, and wherein the executable code that determines is executed by the requesting node prior to executing the executable code that sends for each request.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
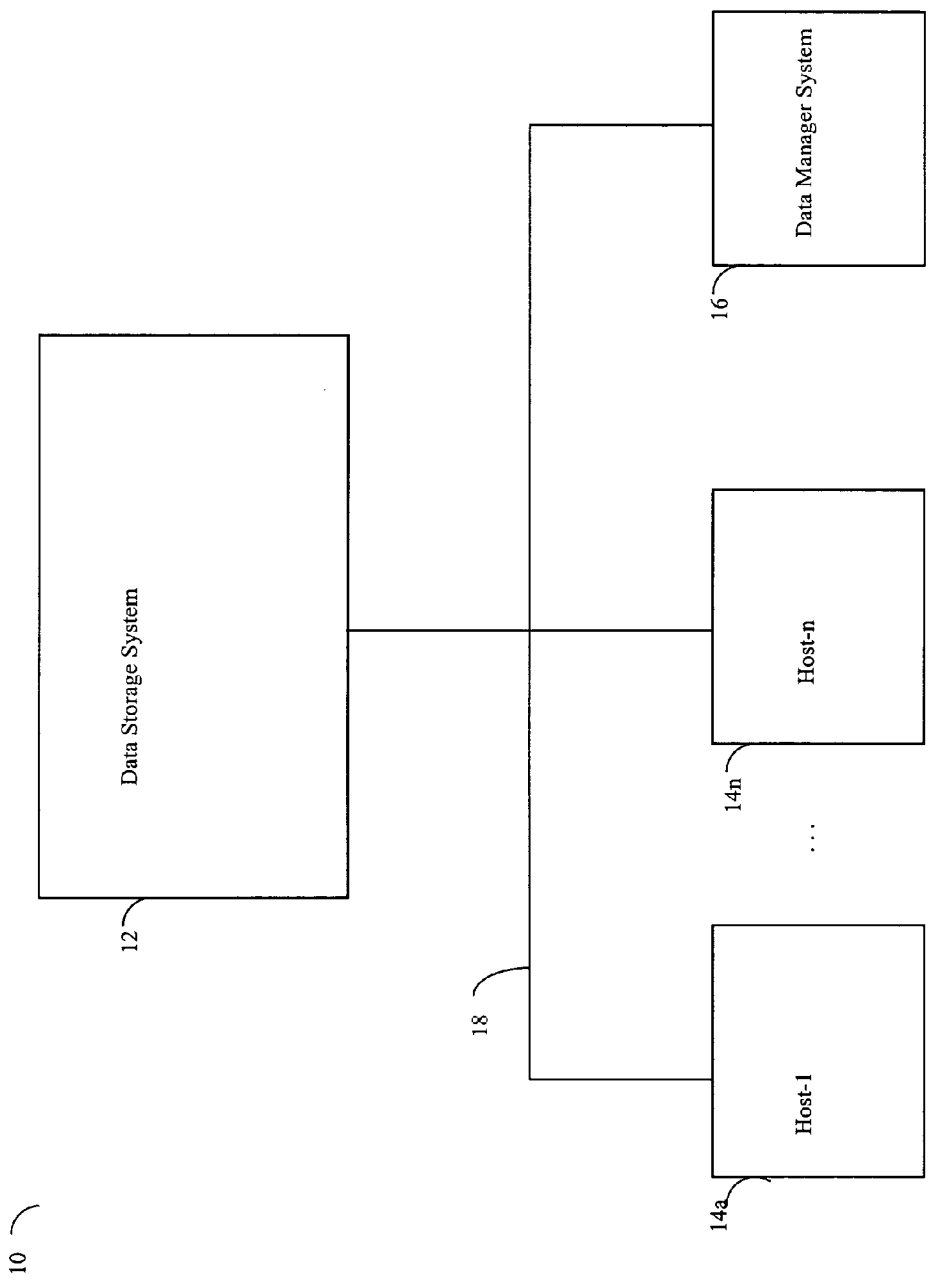
FIG. 1 is an example of an embodiment of a computer system according to the present invention.

Referring now to FIG. 1, shown is an example of an embodiment of a computer system according to the present invention. The computer system 10 includes a data storage system 12 connected to host systems 14a-14n, and a data manager system 16 through communication medium 18. In this embodiment of the computer system 10, the N hosts 14a-14n and the data manager system 16 may access the data storage system 12, for example, in performing input/output (I/O) operations or data requests. The communication medium 18 may be any one of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other connection(s) by which the host systems 14a-14n, and the data manager system may access and communicate with the data storage system 12, and may also communicate with others included in the computer system 10.

Each of the host systems 14a-14n, the data manager system 16, and the data storage system 12 included in the computer system 10 may be connected to the communication medium 18 by any one of a variety of connections as may be provided and supported in accordance with the type of communication medium 18. The processors included in the host computer systems 14a-14n and the data manager system 16 may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 14a-14n and the data manager system 16, as well as those components that may be included in the data storage system 12 are described herein in more detail, and may vary with each particular embodiment. Each of the host computers 14a-14n, as well as the data manager system 16, may all be located at the same physical site, or, alternatively, may also be located in different physical locations. Examples of the communication medium that may be used to provide the different types of connections between the host computer systems, the data manager system, and the data storage system of the computer system 10 may use a variety of different communication protocols such as SCSI, ESCON, Fibre Channel, or GIGE (Gigabit Ethernet), and the like. Some or all of the connections by which the hosts, data manager system 16 and data storage system 12 may be connected to the communication medium 18 may pass through other communication devices, such as a Connectrix or other switching equipment that may exist such as a phone line, a repeater, a multiplexer or even a satellite.

Each of the host computer systems as well as the data manager system may perform different types of data operations in accordance with different types of administrative tasks. In the embodiment of FIG. 1, any one of the host computers 14a-14n may issue a data request to the data storage system 12 to perform a data operation.

Figure 2:
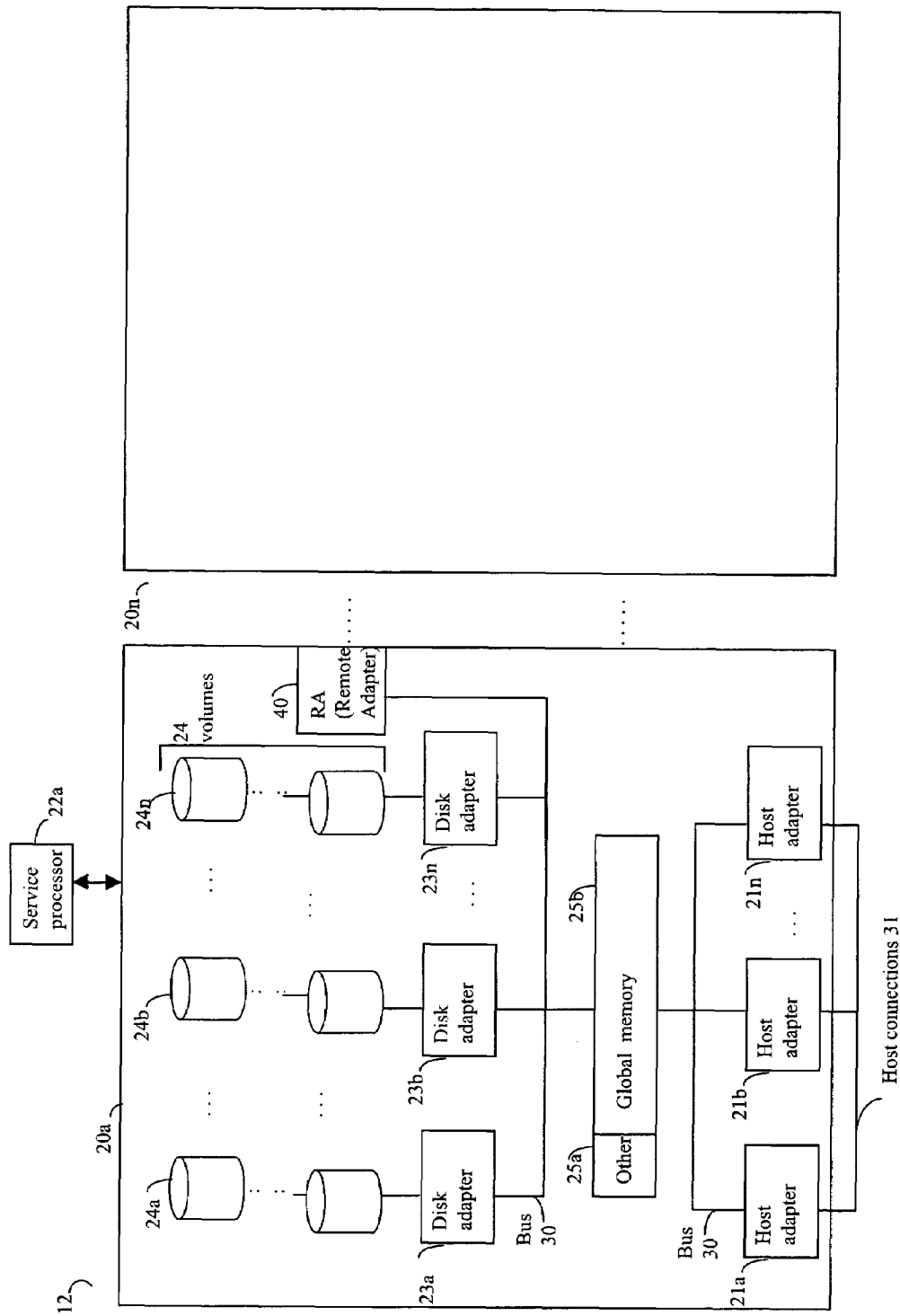
FIG. 2 is an example of an embodiment of a data storage system.

Referring now to FIG. 2, shown is an example of an embodiment of the data storage system 12 that may be included in the computer system 10 of FIG. 1. Included in the data storage system 12 of FIG. 2 are Symmetrix™ storage systems 20a-20n as manufactured by EMC Corporation of Hopkinton, Mass. In this particular example, each of the Symmetrix™ storage systems 20a-20n may be interconnected (not shown) as well as to the host and data manager systems through any one or more communication connections 30 that may vary with each particular embodiment and device in accordance with the different protocols used in a particular embodiment. Additionally, the type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include other types of data storage systems in combination with one or more Symmetrix™ systems. Each of 20a-20n may be resources included in an embodiment of the computer system 10 to provide storage services to, for example, host computer systems and/or the data manager system.

Each of the Symmetrix™ systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the Symmetrix™ system 20a, a single DA, such as 23a, may be responsible for the management of a row of disks or volumes, such as row 24a. Each of the DAs 23a-23n are connected, for example, by a bus 30 to a cache that includes a particular portion designated as global memory 25b. The DAs 23a-23n may perform data operations to and from the cache that may be included in the global memory 25b, for example, in communications with other disk processors or directors, and other components of the system 20a. Generally, the global memory 25b may be used in facilitating communications between components in the system 20a. The other portion 25a is that portion of memory that may be used in connection with other designations that may vary in accordance with each embodiment. In one embodiment, portions of configuration and device information may be stored in global memory 25b.

An embodiment of the Symmetrix™ system 20a may include a service processor 22a used to manage and monitor the system 20a. In one embodiment, the service processor 22a may be used in collecting performance data, for example, regarding the I/O performance in connection with system 20a. This performance data may relate to, for example, performance measurements in connection with a data request as may be made from the different host computer systems 14a-14n. This performance data may be gathered and stored, for example, in the global memory and/or other storage area.

The system 20a may also include one or more host adapters ("HAs") or directors 21a-21n. Each of these HAs may be used to manage communications and data operations between one or more host systems and the global memory.

The particular data storage system as described in this embodiment, such as a Symmetrix™ system by EMC Corporation or a disk, should not be construed as a limitation. Other types of commercially available data storage systems, as well as processors and hardware controlling access to these particular devices, may be also be included in an embodiment.

Also shown in the storage system 20a is an RA or remote adapter 40. The RA may be hardware including a processor used to facilitate communication between data storage systems, such as between two Symmetrix data storage systems. The RA may be used with the Remote Data Facility (RDF) product provided by EMC Corporation of Hopkinton, Mass.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a Symmetrix data storage system and a host system. The RAs may be used in facilitating communications between two Symmetrix data storage systems. The DAs may be used in connection with facilitating communications to the associated disk drive(s) and LV(s) residing thereon.

The DA may cause I/O operations to be performed on a volume or device. In the following description, data may be accessed by LV in which a single DA manages data requests in connection with I/O operations of multiple LVs that may reside on a disk. The DA may accomplish this by creating job records for the different LVs associated with the particular DA. These different job records may be associated with the different LVs in a data structure stored and managed by each DA.

Figure 3:
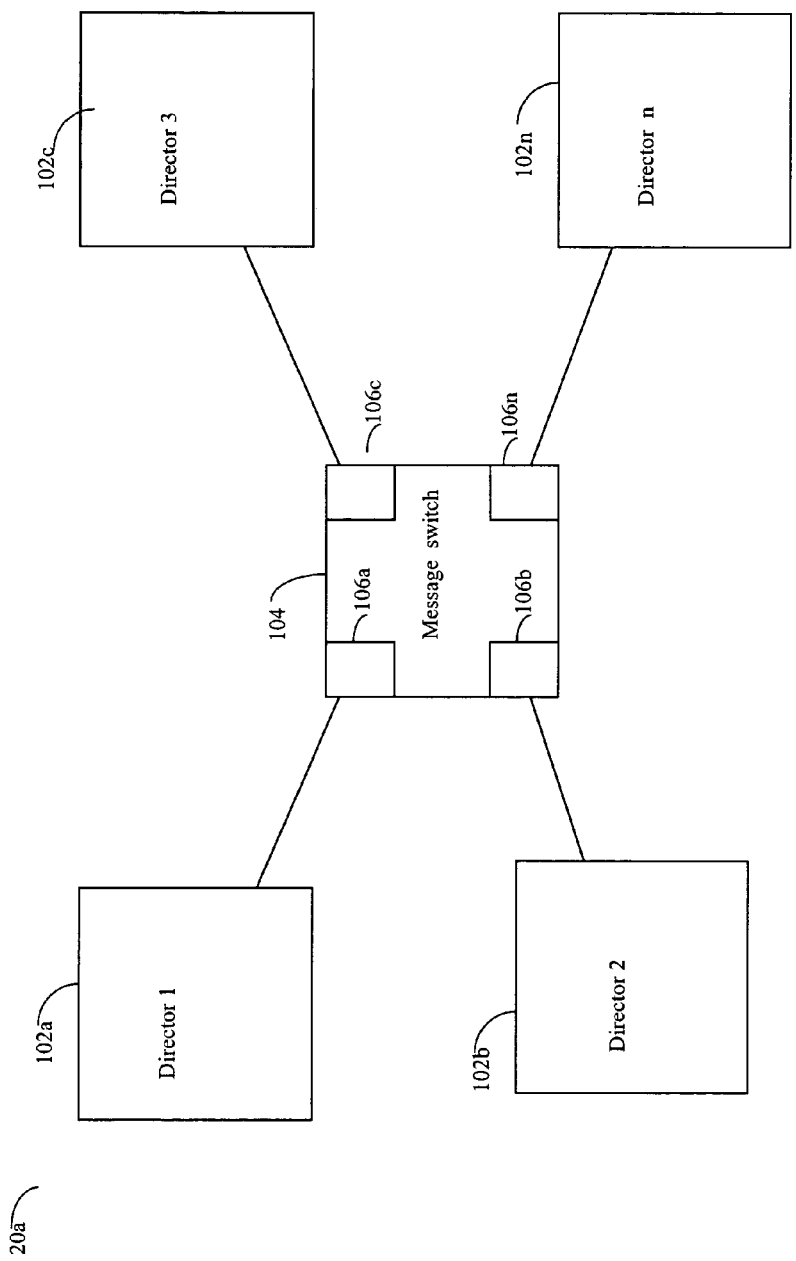
FIG. 3 is a more detailed example of one embodiment of a data storage system.

Referring now to FIG. 3, shown is a detailed example of an embodiment of components that may be included in the data storage system 20a. It should be noted that an embodiment may include other components than as shown in FIG. 3. The data storage system 20a of FIG. 3 presents a simplistic view including only particular components described previously in connection with FIG. 2 for purposes of illustration and example in connection with techniques that are described in the following paragraphs. It should also be noted that the components of FIG. 3 as described in connection with system 20a may also be included in each of systems 20b-20n.

This embodiment of the system 20a includes directors 102a through 102n and a message switch 104. The message switch 104 may be included within the switch fabric. The message switch may be used in routing messages between different directors or processors 102a through 102n. Included in the message switch 104 of this embodiment are a plurality of hardware message buffers 106a-106n. The message switch 104 controls the flow of incoming messages that may be stored in each of the buffers 106a through 106n from a respective director 102a through 102n connected to the message switch. Each of the directors 102a through 102n may be a processor or a printed circuit board that includes a processor and other hardware components. Each of the directors 102a through 102n may be referred to as nodes or endpoints within the system 20a. The message switch in this embodiment provides link-level flow control information by providing for flow of control of messages being transmitted, for example, between the message switch and a single director.

Figure 4:
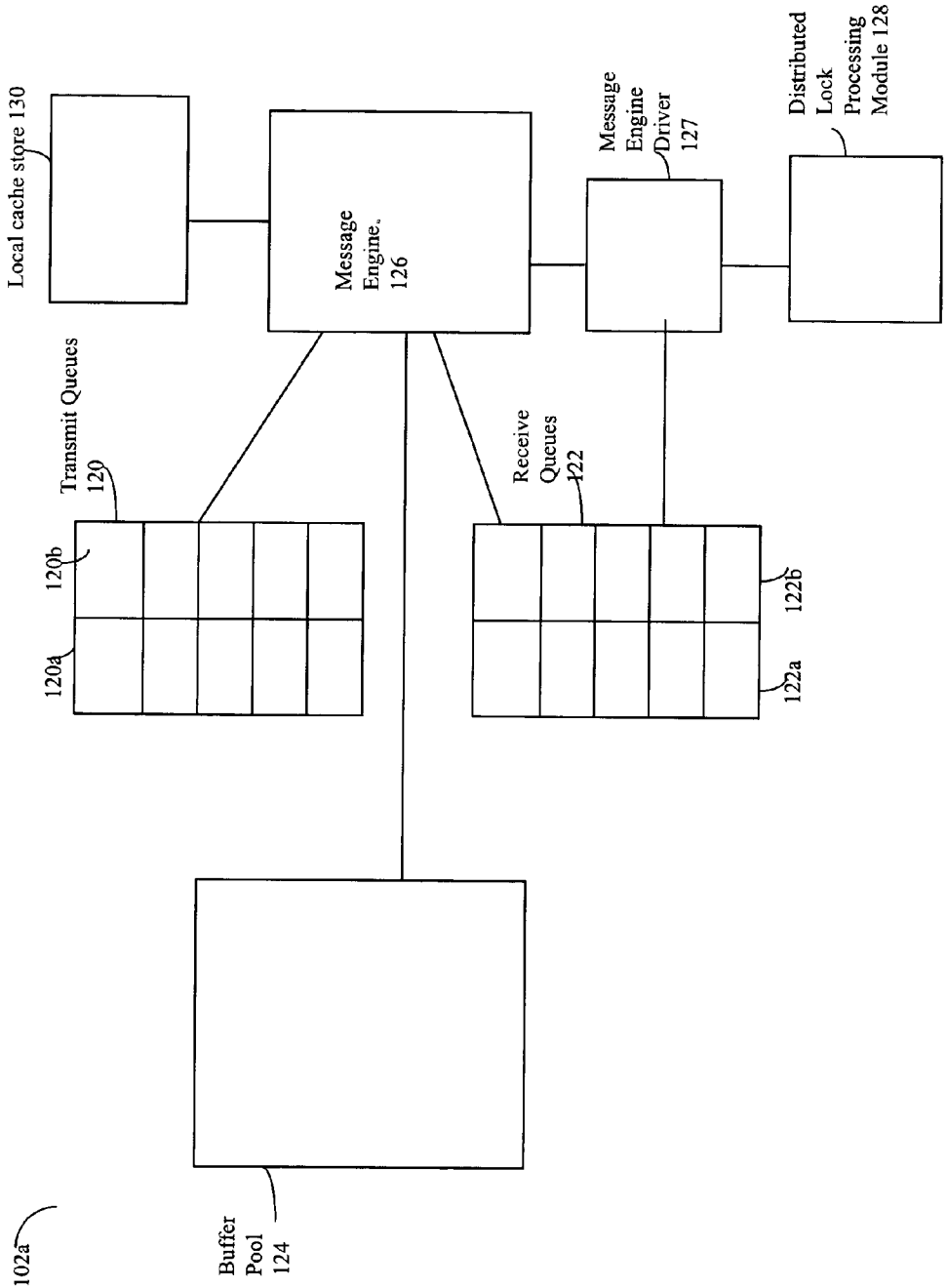
FIG. 4 is an example of an embodiment of components that may be included in a director.

Referring now to FIG. 4, shown is an example of an embodiment of hardware and/or software components that may be included within a director, such as director 102a. It should be noted that although details are shown for a single director 102a, each of the other directors 102b through 102n may similarly include components as described in connection with FIG. 4. An embodiment of a director may also include other components than as shown in FIG. 4. Included in FIG. 4 is a buffer pool 124, transmit queues 120, receive queues 122, a message engine 126, a local cache store (LCS) 130, a Message Engine Driver 127, and Distributed Lock Processing Module 128.

In this embodiment, there are two types of receive queues 122—a data receive queue 122a and a control receive queue 122b—used for buffering received transmissions. Additionally, in this embodiment are two types of transmit queues 120—a data transmit queue 120a and a control transmit queue 120b—used for buffering outgoing transmissions. A transmission or message may be a control transmission or a data transmission. Control transmissions or messages may be characterized as commands used in connection with controlling the flow of data messages between nodes. An embodiment may alternatively have a single transmit and/or receive queue that collectively holds both control and data messages rather than a separate queue for control messages and data messages.

An incoming transmission of the director or node 102a is placed in the appropriate one of the receive queues 122. The incoming transmission may then be retrieved from the receive queue 122 by the message engine 126 which extracts appropriate data portions for processing and places the data within a buffer obtained from the buffer pool 124. An outgoing message is placed in the appropriate one of the transmit queues 120. The message engine 126 extracts the data portion from the transmit queues 120 and forwards it to the message switch. It should be noted that the transmit queues 120 and the receive queues 122 may be used as temporary holding areas for transmissions respectively sent from, and to, a node or director 102a.

The local cache store (LCS) 130 may be implemented in hardware, such as a portion of SDRAM allocated for use by a single director or processor 102a. The LCS may include a locally cached copy of data. In one embodiment, the director 102a may use its LCS 130 to cache a local copy of a portion of data from global memory, such as global memory 25b. Also included in the LCS 130 may be other data items used by the director 102a. In connection with use of the LCS, an embodiment may use any one of a variety of different caching techniques that may vary in accordance with each embodiment.

The Distributed Lock Processing module 128 performs processing associated with lock request messages and lock response messages. As described in more detail elsewhere herein, locks associated with resources requiring synchronization are distributed across the directors within the data storage system. For example, lock 0 may be maintained by director 0, lock 1 may be maintained by director 1, and the like. Each lock may be associated with a resource requiring synchronization. The resource may be any resource such as, for example, a portion of globally accessed memory. If one director wants to request a particular lock, the requesting director sends a lock request message to the appropriate director maintaining that lock. As used herein, the director maintaining a lock may be referred to as the lock owner (LO). The LO may send a lock response message to the requesting director granting or denying the lock. If the requesting director is granted the lock, the requesting director may be referred to as the lock holder (LH) for the time period requested. A lock request message may be sent from any director to any director (as the LO) in accordance with which director is the LO of the required lock. These messages and their use in synchronization techniques for the global distributed locks is described elsewhere herein in more detail.

In one embodiment, the Distributed Lock Processing module 128 may be implemented using instructions which are executed by a computer processor. The instructions may be produced using software.

Transmissions, such as lock request messages and lock response messages, used in coordination and synchronization of resources between multiple directors may be sent using the switch fabric data line or communication connection so that the incoming transmission sent to director 102a is placed into the data receive queue 122a. In this embodiment, the incoming transmission is then retrieved by the message engine 126 from the data receive queue 122a, and forwarded to software for placement and processing. In this embodiment, the message engine 126 retrieves the incoming transmission from the hardware queue, the data receive queue 122a, and then forwards it to the message engine driver 127 for forwarding to the Distributed Lock Processing module 128 if the message received is a lock request message or a lock response message. Similarly, outgoing messages which are lock request messages or lock response messages may be sent to other directors from a broadcasting director's data transmit queue. In one embodiment, the message engine driver 127 is a device driver.

It should be noted that in this embodiment, the transmit queues 120 and the receive queues 122 are implemented in hardware, such as a portion of SDRAM (synchronous dynamic random access memory), and the buffer pool 124 is a portion of memory from which the data is allocated and used in connection with extracting the appropriate data portions of an incoming transmission for use within a particular node. Message engine 126 is implemented in hardware and manages the message queues. The Distributed Lock Processing module 128 may be implemented using software in this embodiment. Data structures and storage areas used by the Distributed Lock Processing module 128 as described herein may be implemented using a portion of memory, such as a RAM (random access memory). Other embodiments may implement these and other components in varying combination of hardware and/or software.

What will now be described are techniques that may be utilized in connection with synchronization of one or more system resources associated that may be accessed by multiple directors using messages sent over the message switch. The techniques described herein may be used in other embodiments, for example, in which the nodes are other endpoints besides the directors as described herein.

The techniques described in the following paragraphs may be used in connection with synchronizing access to a resource used by multiple directors. Each resource has an associated lock and coordination of access to the resource is maintained by a requesting director being granted the resource's associated lock. The directors may be included, for example, in a data storage system, such as the Symmetrix data storage system. The techniques described in following paragraphs may be used in an embodiment having one or more resources requiring synchronization between multiple endpoints.

Figure 5:
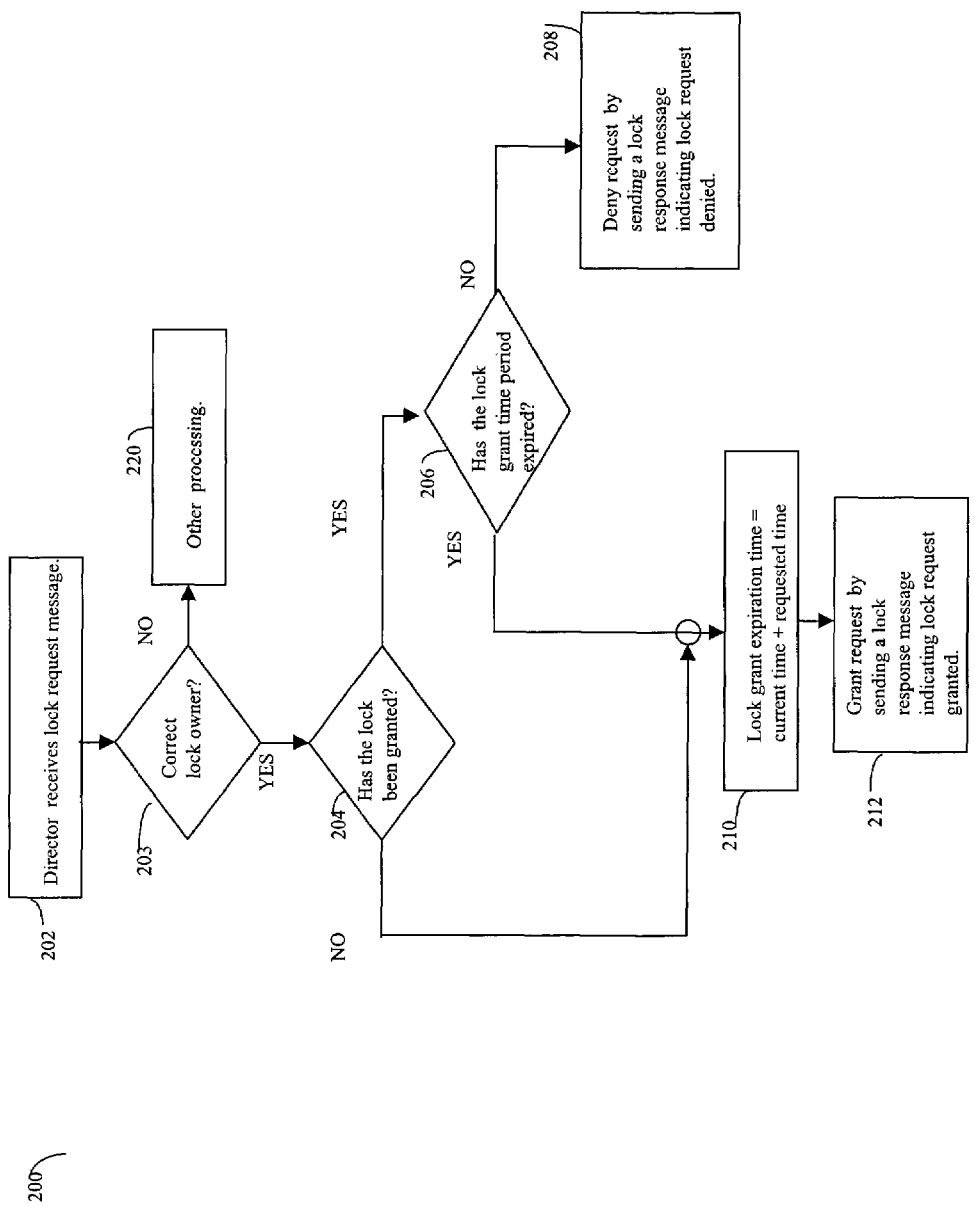
FIG. 5 is a flowchart of method steps of one embodiment that may be performed by the distributed lock processing module in connection with processing a received lock request message.

Referring now to FIG. 5, shown is a flowchart 200 of steps one embodiment that may be performed by the distributed lock processing module 128 in connection with processing a received lock request message. At step 202, a director receives a lock request message. At step 203, a determination is made as to whether the current director is the owner of the lock currently being requested within the received lock request message. If at step 203 the lock identifier included in the lock request message is for a lock for which the current director is not the designated owner, the control proceeds to step 220 where other processing may be performed. The other processing at step 220 may include, for example, the director that received the lock request message returning an error to the requestor. Another embodiment may also perform other processing besides error processing. For example, the director receiving the message may ignore the message and not return any type of message to the requestor. The processing performed at step 220 may vary in accordance with each embodiment.

At step 203, if a determination is made that the director that received the lock request message is the owner of the requested lock, control proceeds to step 204 where a determination is made as to whether the lock has been granted. In one embodiment, a determination may be made that a lock has been granted in accordance with a stored time stamp value of the director currently executing the steps of flowchart 200. For example, a director may store a time stamp value associated with a lock for which the director is the designated lock owner. The time stamp may be initialized with a unique value as an indicator that the lock has not yet been granted to any director. The lock owner may update the time stamp value with a new value each time the lock is granted to indicate the time at which the current lock grant expires. Other embodiments may use other values and indicators to indicate whether a lock has been granted. As described elsewhere herein, this time stamp value may be referred to as specifying the lock grant expiration time.

If at step 204 it is determined that the lock has not been granted, control proceeds to step 210 where a lock grant expiration time is determined as the current time plus the requested time. The requested time used in step 210 is that time period specified within the lock request message that has been received at step 202 indicating the duration of time for which the requesting director is requesting to hold the lock. During this time period, no other requesting director will be granted the lock by the director executing the steps of flowchart 200. Control proceeds to step 212 where a grant request is sent by the director executing the flowchart steps 200 by sending a lock response message indicating that the lock request has been granted for the requested time period.

If at step 204 it has been determined that the lock has previously been granted, control proceeds to step 206 where a determination is made as to whether the lock grant time period has currently expired. In other words, if the lock has been granted, a further determination is made at step 206 as to whether the previously specified lock grant expiration time has expired. A determination may be made at step 206, for example, in an embodiment by comparing the current time against the lock grant expiration time previously calculated by executing step 210 in connection with processing a previous lock request message. If the current time is greater than or equal to the lock grant expiration time, control proceeds to step 210 and step 212 for processing in connection with granting the request for the lock. Otherwise, at step 206 if it is determined that the lock grant time period has not expired, control proceeds to step 208 where the request is denied by sending a lock response message indicating that the lock request has been denied.

It should be noted at step 208 and step 212 that the lock response message is sent to the sender of the lock request message received at step 202. The lock request message received at step 202 may include an indicator as to the sending node of the lock request message.

A determination at step 206 that the lock grant time period has not expired indicates that previous requestor of the lock still is the current lock holder. Accordingly, the director executing the steps of flowchart 200 does not grant the lock to a new requestor while it is indicated by the lock grant expiration time that the lock is currently granted to another director.

Figure 6:
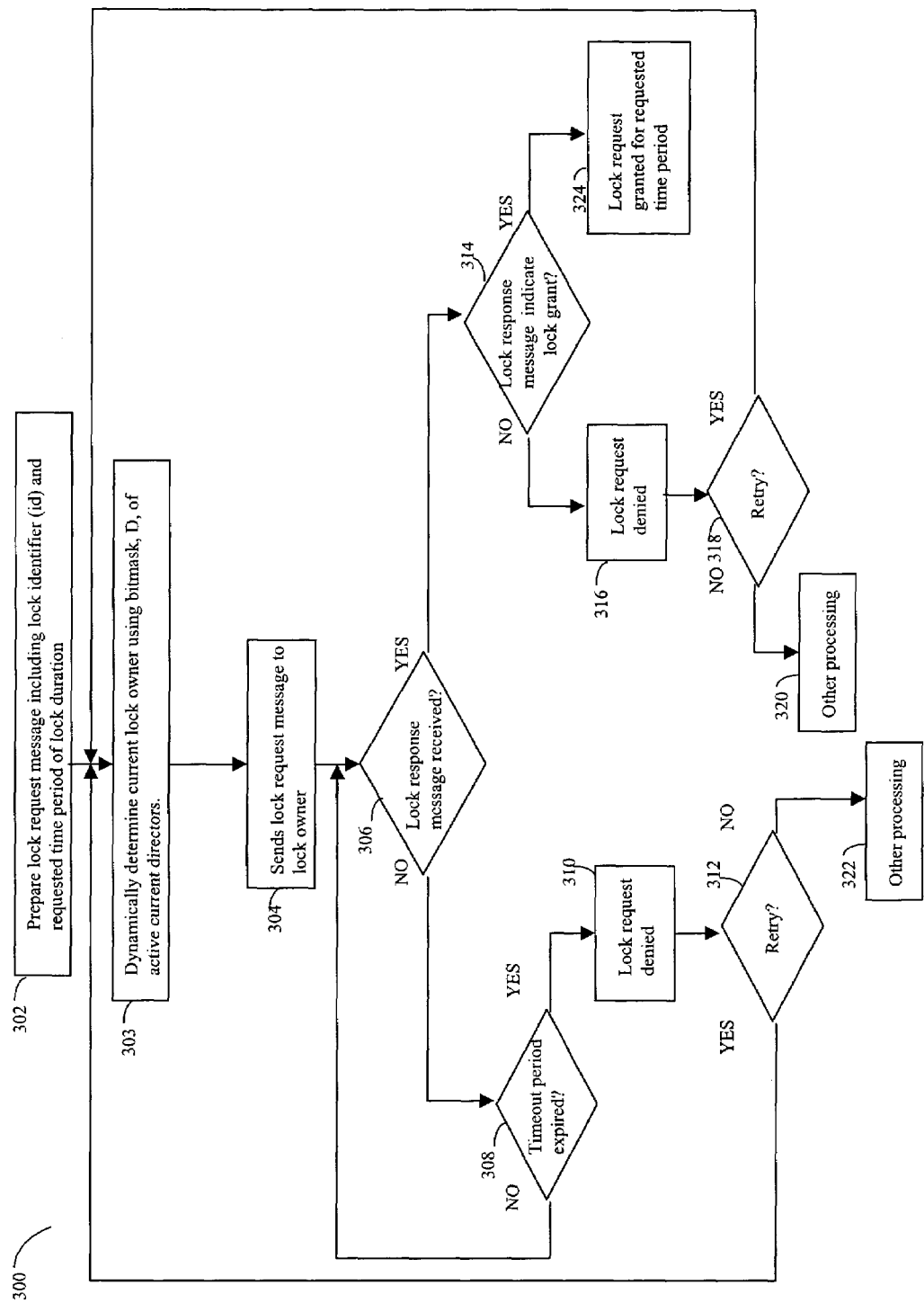
FIG. 6 is a flowchart of method steps of one embodiment that may be performed by a director in connection with requesting a lock.

Referring now to FIG. 6, shown is a flowchart 300 of steps of one embodiment that may be performed by a director in connection with requesting a lock. At step 302, the requesting director prepares the lock request message. In this embodiment, the lock request message includes a lock identifier (id) and a requested time period of lock duration. The lock identifier serves as a unique identifier of the current lock which the director executing the steps of flowchart 300 is requesting. The requested time period specifies the duration for which a requesting director executing the steps of flowchart 300 is requesting the lock. In other words, for the requested time period included in the lock request message being prepared at step 302, the requesting director is considered the lock holder of the requested lock identified by lock identifier.

At step 303, the current lock owner is dynamically determined in accordance with the current set of active or available directors. In one embodiment, a bitmask (D) may be used to indicate which of the directors in the data storage system are currently active and not off-line. The bitmask may include a bit for each director having a value of "1" if the director is currently active and available. Otherwise, the director's corresponding bit in the bitmask is "0". In one embodiment, for example, there are 64 directors and the bitmask includes 64 bits. Using this bitmask at step 303, an embodiment determines a lock owner for each lock. An embodiment may sequentially associate the first lock with the first active director, the second lock with the second active director, and so on. Other embodiments may use other techniques in assigning locks to lock owners. Each director has a local copy of the bitmask which may be synchronized with other local bitmask copies of each director. In one embodiment, a global copy of the bitmask may be maintained in a portion of global memory. Each director may have a local cached copy of the bitmask that may be stored, for example, in the LCS of each director or other memory area. Any one of a variety of different techniques may be used to synchronize the local bitmask copies. The operating system may automatically update the bitmask copy in global memory. Directors may poll global memory to determine when there has been a change in the bitmask and accordingly update local copies in a synchronized manner. An embodiment may also provide for sending bitmask updates, such as with a prioritized message, to each director and ensuring that each director updates the local copy prior to any one director subsequently using the bitmask values. Other embodiments may use any one or more other techniques in connection with maintaining copies of the bitmask on each director.

At step 304, the director sends the lock request message to the lock owner. At step 306, a determination is made as to whether a lock response message has been received in connection with the request message sent at step 304. If not, control proceeds to step 308 where a determination is made as to whether a time out period has expired. In this embodiment, a requesting director executing the steps of flowchart 300 may wait a predetermined time period for a response before determining that lock request has been denied. If at step 308 it is determined that the time out period has not yet expired, control proceeds to step 306 where a determination is again made as to whether the lock response message has been received.

If at step 308 it is determined that the time out period has expired, control proceeds to step 310 where the requesting director concludes that the lock request has been denied. It should be noted that an embodiment may perform additional processing at step 310 in connection with a conclusion that the lock request has been denied based on a no response. At step 312, a determination is made in this embodiment as to whether the requesting director will attempt a retry of requesting the lock. If so, control proceeds to step 303 where the current lock owner is determined. Control then proceeds to step 304 where a lock request message is once again sent to the lock owner. It should be noted that in connection with step 312, a requestor may attempt a certain number of predetermined retries for requesting the same lock, or make a number of requests for the same lock within a predetermine time period. Other embodiments may use other conditions in connection with attempting a retry one or more times. Additionally it should be noted that in connection with a retry a determination at step 312, control may also proceed to step 302 rather than step 303 in an embodiment.

If at step 312 a determination is made that the requesting director does not want to attempt a retry of requesting a grant of the lock, control proceeds to step 322 where other processing may be performed. The processing at step 322 may vary in accordance with each embodiment. It may include, for example, a form of error processing, a further determination as to whether there is a problem with the hardware and/or software on this node or on the node of the director designated as the lock owner of the lock currently being requested, and the like.

If at step 306 a determination is made that a lock response message is received, control proceeds to step 314 where a further determination is made as to whether the lock response message indicates that the lock being requested has been granted. If so, control proceeds to step 324 where processing continues in connection with the lock request being granted for the requested time period. As part of step 324, an embodiment may perform processing steps associated with receiving a lock request grant. If at step 314 it is determined that the lock response message does not indicate a lock grant, control proceeds to step 316 where it is determined that the lock request has been denied and lock request denial processing may be performed. Additionally, control proceeds in this embodiment to step 318 where a determination is made as to whether the requesting director executing the steps of flowchart 300 wants to attempt a retry. For example, the lock request may have been denied because the lock being requested has already been granted to another director. The director executing the steps of flowchart 300 may, at step 318, determine that a retry operation is to be performed, for example, after a predetermined time period such as several milliseconds. An embodiment may attempt to perform one or more retries by proceeding back to step 303 a predetermined number of times.

Additionally, it should be noted that in connection with a retry determination at step 318, control may also proceed to step 302 rather than step 303 in an embodiment. If at step 318 it is determined that a retry is not to be performed, control proceeds to step 320 where other processing may be performed. The other processing at step 320 may include, for example, error processing and other steps that may vary in accordance with each embodiment as well as the particular resource that may be associated with the lock being requested.

Each director within the data storage system 20a in this embodiment may include code that performs the foregoing processing steps of FIGS. 5 and 6. The method steps of FIG. 5 may be performed by the Distributed Lock Processing Module 128 in connection with processing a received lock request message. The method steps of FIG. 6 may be performed by the Distributed Lock Processing Module 128 in connection with sending a lock request message. It should also be noted that the data items used by each director in processing steps of FIGS. 5 and 6, such as the expiration time of a lock, may be stored in a portion of memory, such as from local RAM, used by the director.

Figure 7:
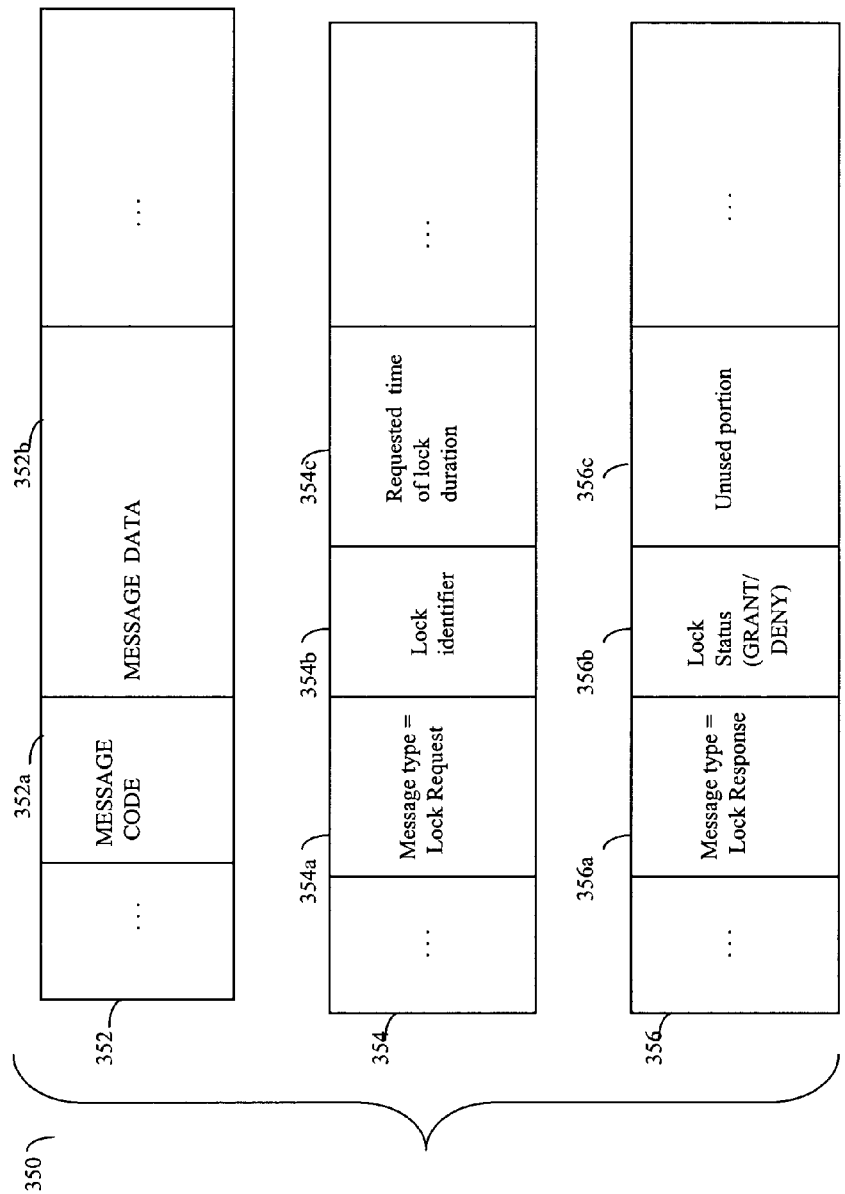
FIG. 7 is an example of message formats that may be utilized in a data storage system in connection with implementing the lock request and lock response messages.

Referring now to FIG. 7, shown is an example of message formats 350 that may be utilized in the system 20a in connection with implementing the lock request and lock response messages. The lock request and lock response messages are examples of data messages that may be sent between nodes using the transmit data queues and receive data queues.

The message format 352 represents a generic message format that may be used in connection with transmitting the lock request and lock response messages in an embodiment of the network described herein. The generic format 352 includes a message code portion 352a and a message data section 352b. Other data may be optionally included in other preceding or subsequent message sections. The format 354 is a representation of the lock request message in accordance with the generic format 352. The message code portion 352a of the lock request message may include a message type field 354a indicating this is a lock request message. Each message type may be a unique code associated with a particular type of message The message data portion of the lock request message 354 may include a lock identifier 354b and a requested time of lock duration 354c. The lock identifier 354b may be a numeric field large enough to accommodate the range of lock identifiers. The requested time of lock duration 354c may specify an absolute amount of time such as in milliseconds. The format 356 for a lock response message includes a message type 356a, a lock status 356b and an unused portion 356c. The message code portion 352a may include the field 356a, and the message data portion 352a may include the fields 356b and 356c. Other data may be optionally included in other preceding or subsequent message sections. The message type 356a may be a unique message code type identifying this message as a lock response message. The lock status 356b may be a boolean bit flag indicating whether a lock has been granted or denied. It should be noted that portion 356c is unused in this example and may be initialized, for example, to a zero value. The size of each field, format and type may vary with each embodiment and the particular standards and messaging techniques included in an embodiment.

It should be noted that the generic format 352 may be used in connection with both control or command transmissions and data transmissions. In this example, as described elsewhere herein, the lock request message and lock response message are data transmissions.

What will now be described are examples at various points in time illustrating the techniques of the distributed locking technique described herein.

Figure 8:
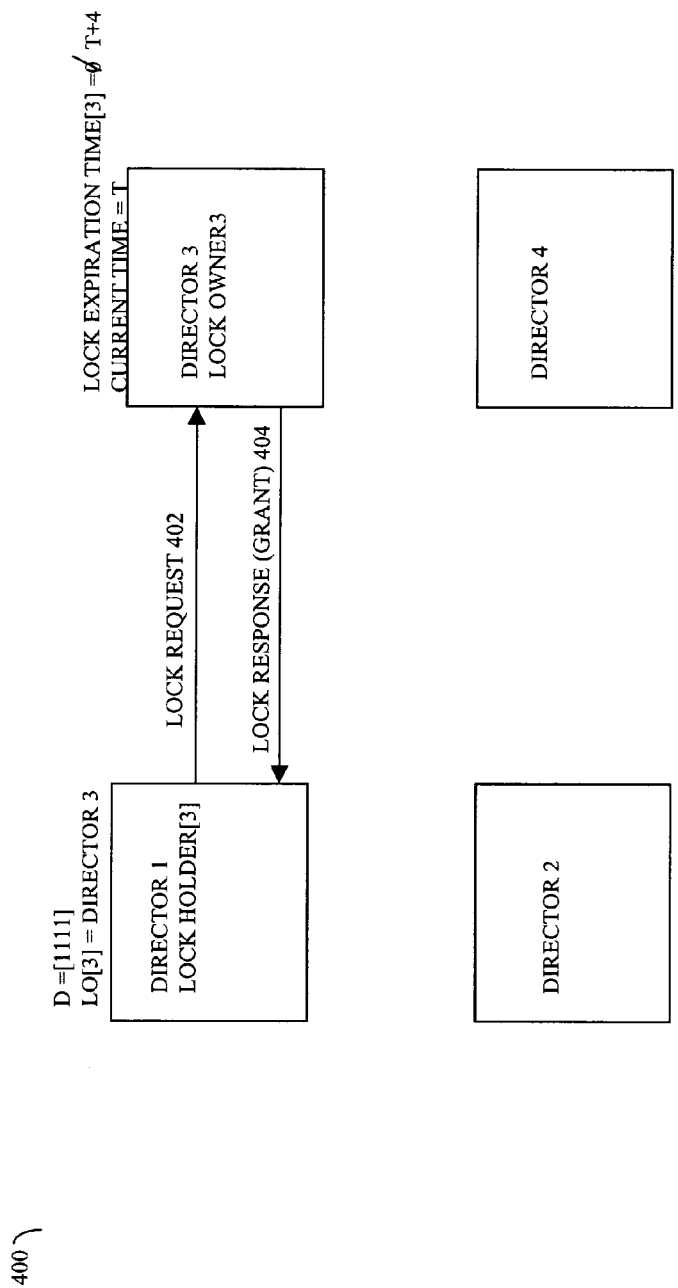
FIGS. 8-14 are examples at different points in time illustrating the distributed locking techniques described herein in one embodiment.

Referring now to FIG. 8, shown is an example 400 at a first point in time T at which director 1 issues a lock request 402 to director 3. From director 1's point of view, the lock owner of lock 3 (LO[3]) is determined to be director 3 since all of the directors are currently on line and available as indicated by the bitmask D. Director 3, as lock owner 3, receives the lock request 402 having a request time of 4 units. Director 3 determines that no other director has requested lock 3 and accordingly updates its lock expiration time for lock 3 to be at time T+4. In response, director 3 issues a lock response grant message 404 to director 1. Director 1 believes that it is the lock holder of lock 3. The lock holder status for lock 3 has been granted to director 1, from director 1's point of view, until the expiration time requested of T+4.

Figure 9:
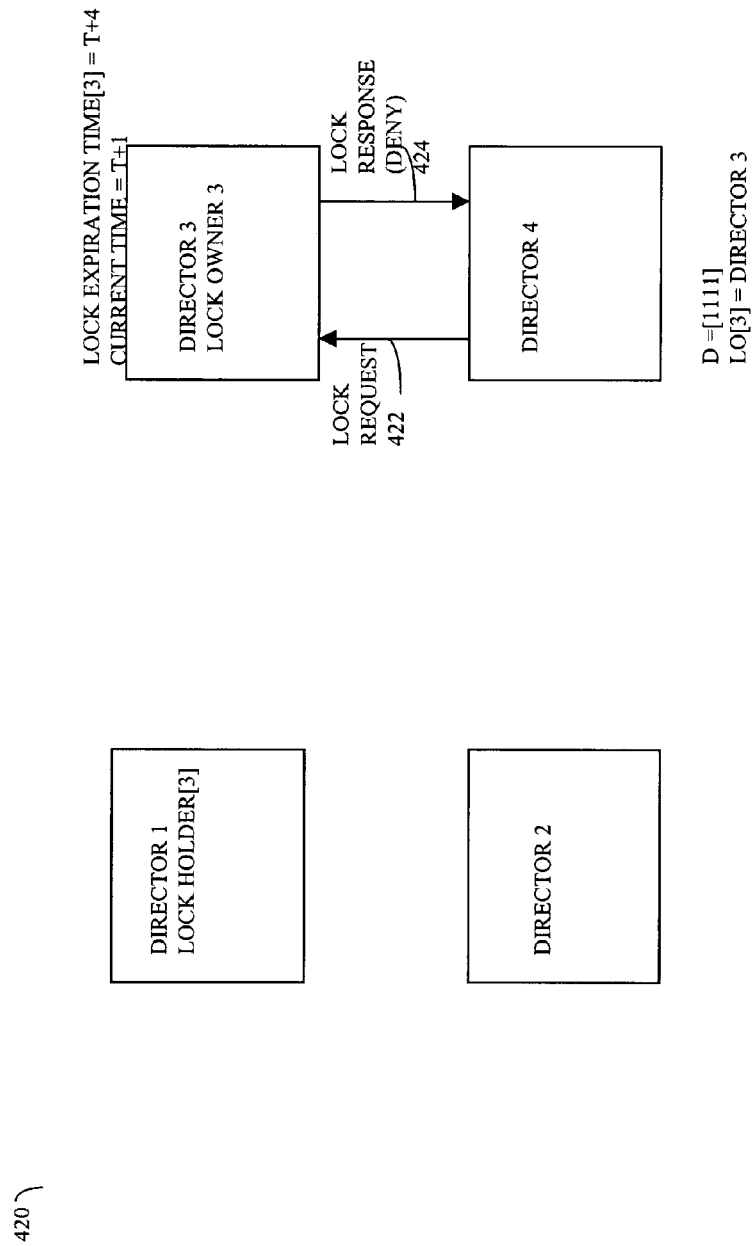

Referring now to FIG. 9, shown is a subsequent illustration 420 at a point in time T+1 at which director 4 tries to obtain lock 3 from director 3 while the lock 3 is currently granted to director 1. Director 4's lock request 422 is thus denied as indicated in the lock response denial 424. Director 3, as lock owner of lock 3, determines that at the current time of T+1, the lock has been granted to director 1 until time T+4.

Figure 10:
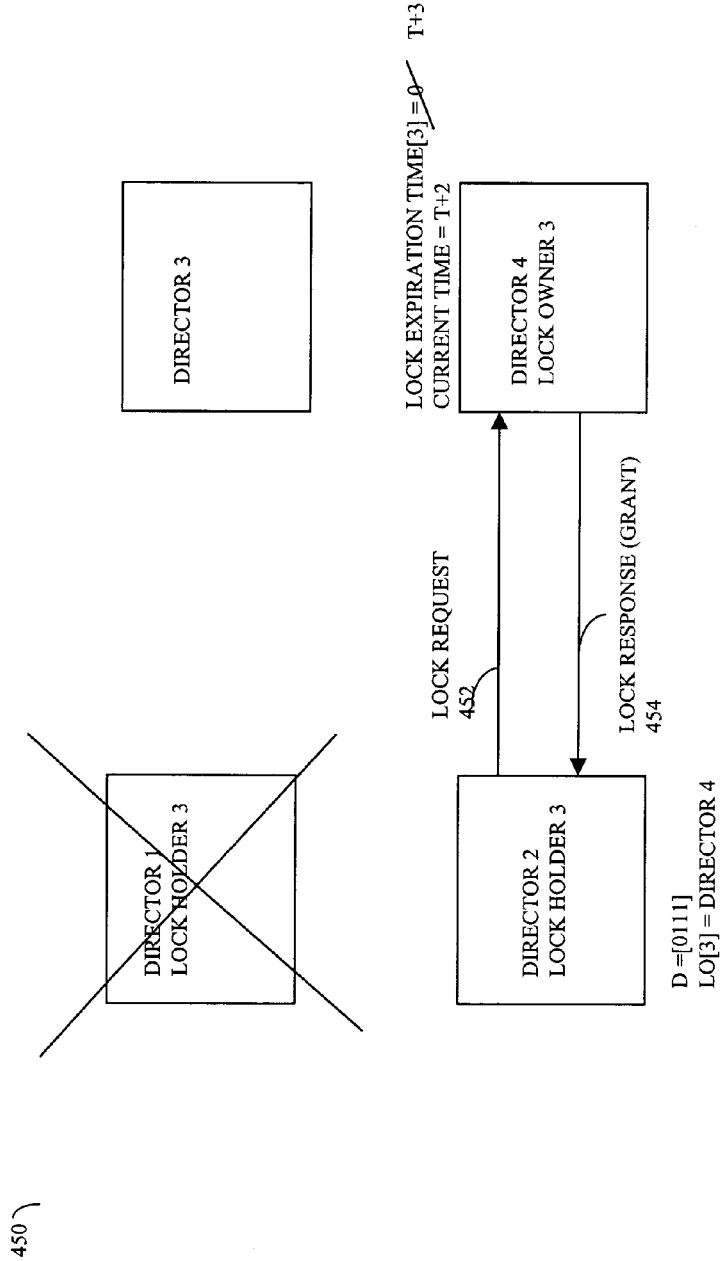

Referring now to FIG. 10, shown is an illustration 450 representing the status of lock holders and owners at time T+2. Director 1, which believes it is the lock holder of lock 3, becomes unavailable and goes off line. The bitmask D of each director is updated to indicate that director 1 is unavailable. Additionally at time T+2, director 2 prepares to issue a lock request for lock 3. Director 2 uses its local copy of the D bitmask and determines that lock owner 3 is now director 4. Director 2 then issues lock request 452 to director 4 as lock owner 3. Director 4, as lock owner 3, determines that it has currently not granted the lock to any director and issues a lock response grant message 454 to director 2. The lock request 452 issued from director 2 has requested that director 2 be deemed the lock holder for a time of one time unit until the time of T+3.

Regarding the illustration 450, it should be noted that each director wishing to request a lock executes code to dynamically determine the lock owner with each request. This dynamic lock owner determination each time a lock request is to be issued by a director results in the assignment of a lock to a lock owner. The locks are distributed to directors as lock owners in accordance with those directors which are currently available and on line. This provides for lock reassignment. In the example 450 at time T+2, a new request for lock 3 has been granted prior to the old expiration time T+4 in the embodiment described herein. This may occur in an embodiment when the current lock holder dies or goes off line. An embodiment may provide, for example, as described in the illustration 450, releasing any locks held by a lock holder such that the lock may subsequently be granted. This lock releasing process may happen automatically as a result of the techniques described herein as illustrated in the example 450 of FIG. 10.

Figure 11:
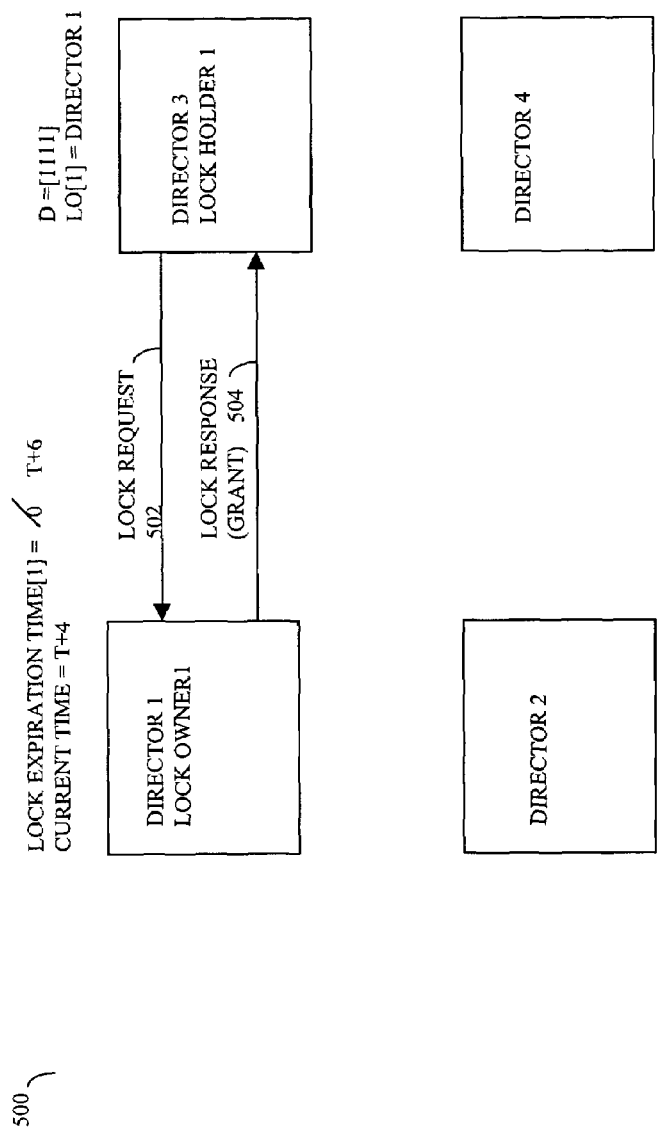

Referring now to FIG. 11, shown is an example 500 at a subsequent point in time T+4. In the example 500 at time T+4, all of the directors are available and director 3 is preparing to issue a lock request to the lock owner of lock 1. Prior to issuing the lock request, director 3 determines that the lock owner of lock 1 is director 1. The lock request 502 is issued to director 1. The lock request 502 in this example is requesting the lock for two additional time units. Upon receipt of the lock request 502, director 1 as lock owner 1 determines that it is able to grant the lock. Director 1 accordingly updates the lock expiration time for lock 1 to T+6 and sends a lock response grant message 504 to the requestor director 3. From director 3's point of view, it is the lock holder of lock 1 until the time period of T+6.

Figure 12:
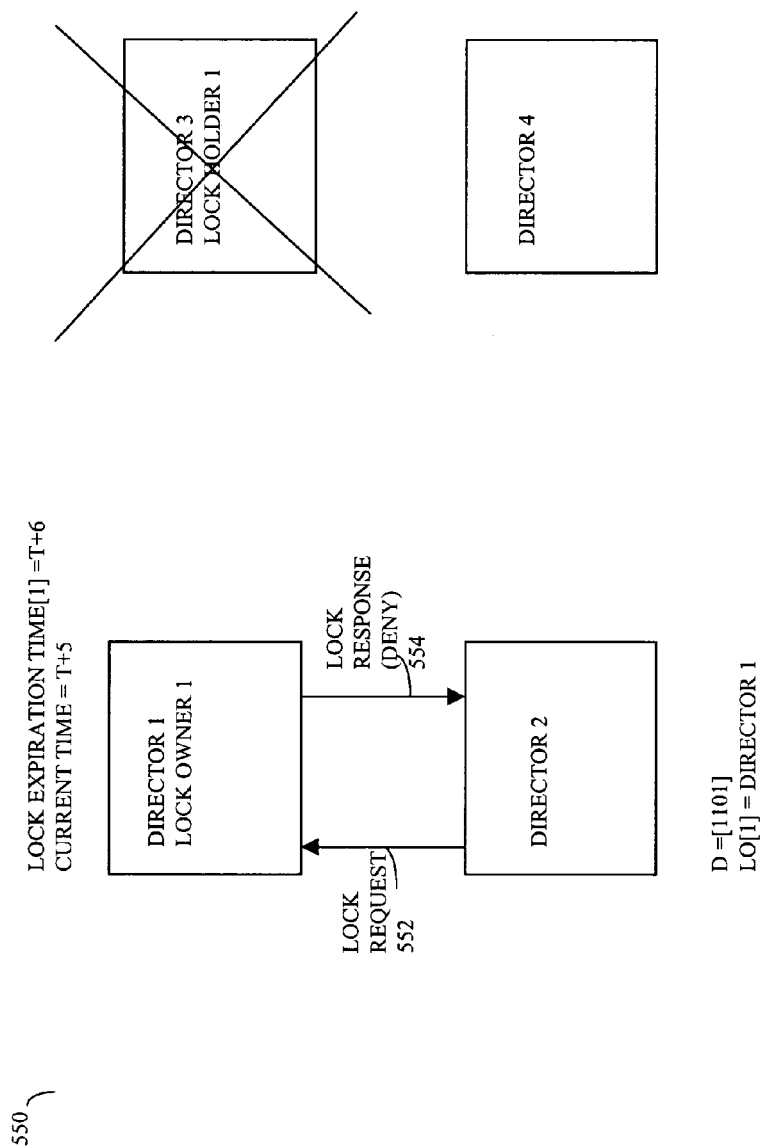

Referring now to FIG. 12, shown is the subsequent illustration 550 at time T+5. At time T+5, the current lock holder 1 which is director 3 becomes unavailable. At the same point in time at T+5, director 2 issues a lock request 552 to director 1 as the lock owner of lock 1. Director 1 as lock owner 1 determines that it has previously granted the lock to another requestor which is due to expire at time T+6. However, the current time is T+5 and, accordingly, director 1 as lock owner 1 determines that it must deny the request. Director 1 as lock owner 1 issues a lock response denial message 554 to director 2.

Figure 13:
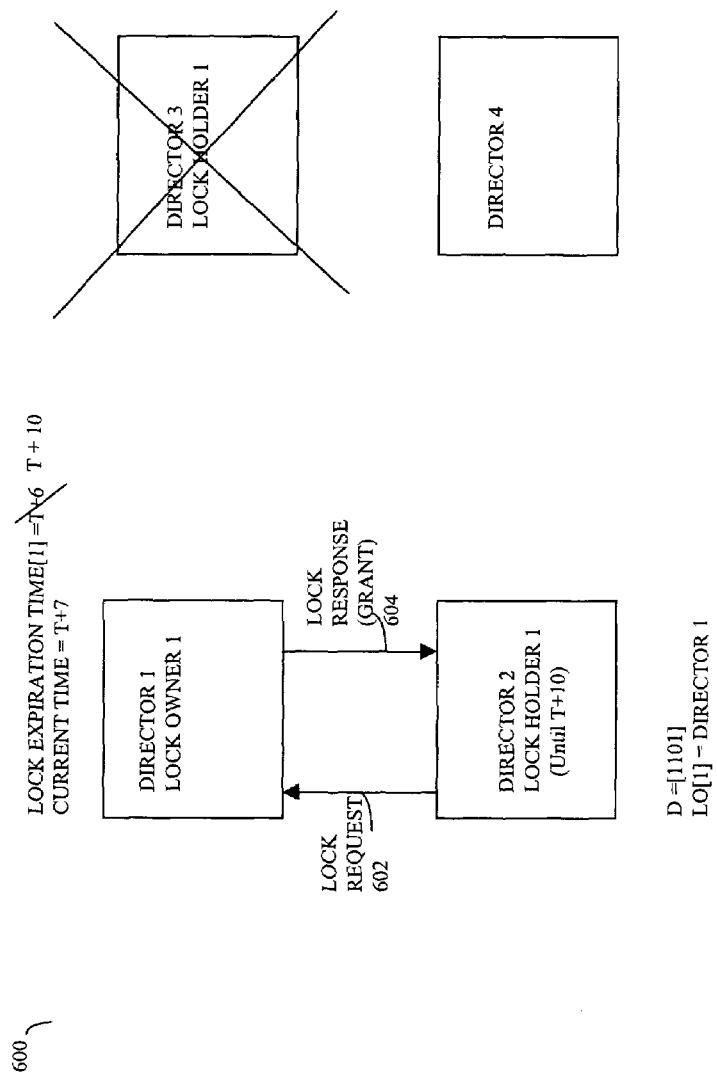

Referring now to FIG. 13, shown is an example 600 illustrating the state of lock holders and lock owners at a time of T+7. At the time of T+7, director 2 retries an attempt to be granted lock 1. Director 3 is still off line as indicated by the bitmask D. Director 2 issues lock request 602 to director 1 as lock owner 1. At the current time of T+7, director 1 as lock owner 1 determines that the current time is greater than the lock expiration time for lock 1 of T+6. In other words, director 1 as lock owner 1 determines that the lock request previously granted to director 3 has expired. Accordingly, director 1 as lock owner 1 updates its lock expiration time to be T+10 in accordance with the value of 3 units as included in the lock request 602. Director 2 has requested lock 1 for a total of three time units to expire at T+10. Director 1 as lock owner 1 issues a lock response message 604 with a grant indication to director 2. From director 2's point of view at this point in time, director 2 is the lock holder of lock 1 until the time of T+10.

It should be noted in connection with the example 600 that although the lock holder 1, director 3, became unavailable, the expiration time as maintained by the lock owner causes the lock to be available automatically for grant to another requestor upon the current time reaching the expiration time. This provides for automatic management of locks to provide for addressing the instances where a lock holder goes off line and becomes available. The lock grant automatically expires.

Figure 14:
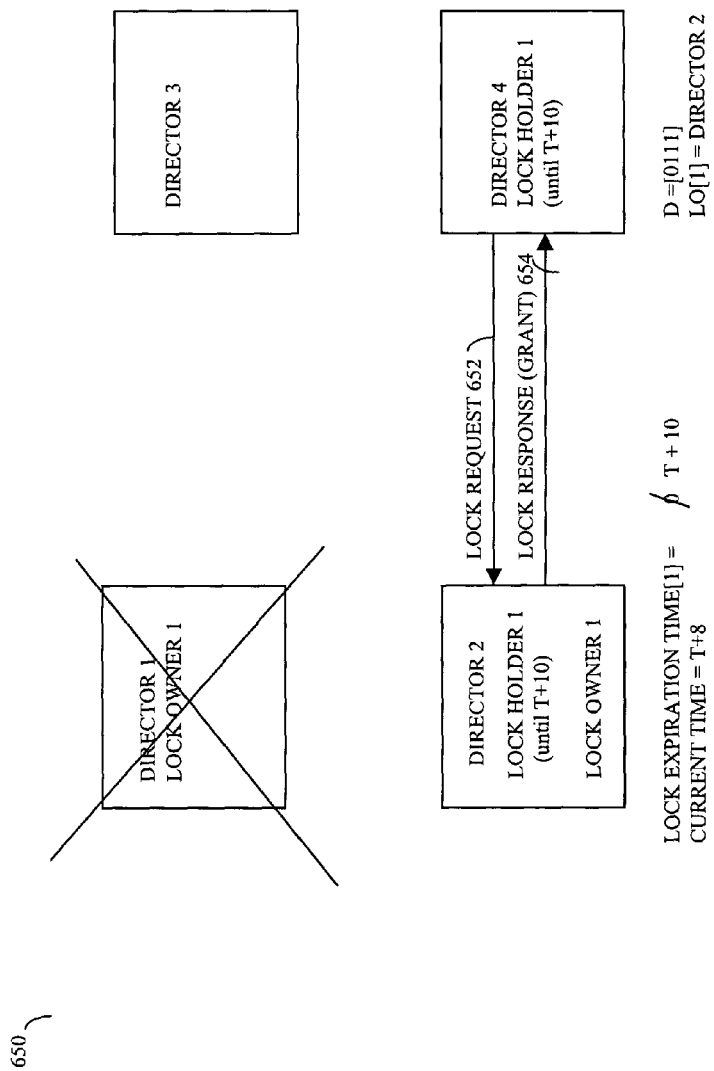

Referring now to FIG. 14, shown is an example 650 at the current time of T+8 illustrating the status of lock holders and lock owners. Lock owner 1, which is director 1, becomes unavailable. Note that director 2 still believes that it is the lock holder of lock 1 until the time period of T+10. However, at the current time of T+8, director 4 prepares to issue a lock request for lock 1. Director 4 determines that director 1 is inactive or off line and also determines lock owner 1 as director 2. Director 4 issues lock request 652 for lock 1 to director 2. Director 2, as lock owner 1, determines that it has not previously granted a request for lock 1 and issues a lock response message 654 with a grant indication to director 4. Director 2, as lock owner 1, updates the lock 1 expiration time as T+10 since the lock request 652 requested lock 1 for a time period of two time units.

In the foregoing example 650, both director 2 and director 4 believe they are each lock holders of lock 1 until the time period of T+10. This illustrates an instance when a lock owner goes off line or is unavailable, two directors may have overlapping lock holder statuses from the points of view of each of the different directors. However, note that the conditions associated with the overlapping lock holder status for the same lock, such as with director 2 and director 4, are deterministic and bounded. In other words, it is a known condition that may handled as needed in accordance with a particular application when the lock owner goes off line. Accordingly, an embodiment may take this deterministic condition into account and use other techniques in connection with such instances to avoid such conditions as illustrated in the example 650 of FIG. 14.

The foregoing description illustrates the use of a lock primitive that may be included in an embodiment. Particular conditions associated with avoiding the conditions as illustrated in the example 650 of FIG. 14 may be handled, for example in software and/or hardware, if it is determined by the executing application that it is a necessary condition to be dealt with.

It should be noted that the locks described herein may be implemented in software and/or hardware. In one embodiment, locks are registered with the operating system such that, for example, when the lock holder goes off line, the operating system releases those locks. The next process able to obtain the lock depends on the order in which processes are scheduled to run. The lock as described herein may be contrasted, for example, to a semaphore. In connection with a semaphore, the next process granted the semaphore is in accordance with placement on a list of processes waiting on the semaphore which is independent of how these processes are scheduled to be executed.

Using the foregoing techniques as described herein for this embodiment, a lock grant expires when a lock owner becomes unavailable. This may present a problem in some instances, for example, when a lock has been granted recognizing a director as a lock holder and the lock owner becomes unavailable prior to expiration of the lock grant to the lock holder. It may be up to the application to handle this condition. However, using the techniques described herein, the times and conditions under which such behavior may occur are predictable and deterministic as well as bounded. Accordingly, an application using the distributed lock techniques described herein may enforce the condition of only a single lock holder for each lock in the instance where a lock owner goes off line. The application may use an additional mechanism to handle this condition if needed to avoid the occurrence of two directors believing they are each the exclusive lock holder of the same lock.

Any one of a variety of different techniques may be used in connection with this processing. An embodiment, for example, may disable the granting of all locks for a predetermined amount of time in accordance with the maximum request time for any lock. This may not be a viable solution in all instances because this may lead to an inefficient use of computer resources. Another embodiment may use other conditions to determine a solution in accordance with what is acceptable for the particulars of that particular embodiment. An embodiment may also provide, for example, some type of notification to all the directors when a particular lock owner goes off line. This notification may identify, for example, the locks this particular director was the current owner of when it went off line.

Using the techniques described herein, locking primitives may be defined and used in an embodiment for synchronization of resources in a distributed manner. Certain conditions may occur, such as illustrated in example 650 of FIG. 14, which may not be desirable behavior in some embodiments. However, this behavior which may be characterized as unwanted or undesirable for use with certain applications is a bounded and deterministic condition. Accordingly, an application or other type of mechanism may be used in connection with detecting and handling this condition if needed in connection with an embodiment.

Using the techniques described herein, a requestor of a lock either obtains a response indicating whether the lock has been granted or not, or may time out in connection with a failure, for example, if the message is not being successfully received by the lock owner. When the lock owner receives the request, the lock owner may grant the request if the lock is currently not granted to another. In the event that a lock holder dies or goes off line, the automatic expiration period provides for automatic management of the lock. If the lock holder dies, the maximum amount of time the lock will be unavailable is in accordance with the requested time. If the lock owner dies, the lock ownership is dynamically reassigned every time there is another request for a lock. One characteristic or condition, although bounded and deterministic, that may not be desirable may occur using the foregoing techniques when a lock owner dies and the lock has already been requested and granted to a lock holder. At this point in time, from the point of view of the new lock owner, the lock has expired. However, from a point of view of the lock holder, the lock holder still believes that it has been granted the lock until its requested expiration time. Other techniques may be used in an embodiment as necessary to handle this instance. Embodiments may use other techniques in connection with handling the condition as illustrated in the example 650 of FIG. 14 if necessary for the particular application.

The foregoing techniques are flexible and provide for a distributed and efficient technique for lock usage. The locks may be associated with resources of any one or more different types. For example, in one embodiment, each of the locks may be associated with a portion of global memory or other globally accessed resource.

In one embodiment, the techniques described herein may be used in a Symmetrix data storage system to control access to a switchboard including multiple switches that may be used in connection with message exchanges between directors or processors as described herein. An embodiment may include a lock for each switch on the switchboard, and also another switchboard lock for controlling access to the single switchboard. The switchboard lock may be implemented using the techniques described herein.

The foregoing techniques provide for efficient lock management such as, for example, when lock holders and/or lock owners become unavailable. The foregoing messages, such as the lock request message and the lock response message, may be sent between directors using the message fabric as described herein. The messages may be sent as Unicast messages. Other embodiments may use other techniques in connection with communicating the messages described herein.

As described herein, the buffer pool may be used as a pool of free buffer space for the transmit queue and/or the receive queue. The extent to which this space is used may affect the selection and tuning of system parameters that may vary in accordance with each embodiment.

In connection with messages transmitted in the foregoing, it should be noted that other messages may be sent in response to receiving a message, such as an acknowledgement message, in accordance with the messaging protocol utilized. An acknowledgement message may be sent, for example, in response to a node or endpoint receiving a broadcast message. In the embodiment described herein, messages may be sent and generated by the hardware.

The foregoing embodiment described herein, such as in connection with FIG. 3, uses the same communication connection to transmit control messages and data messages. An embodiment may also use separate connections for transmitting each of control messages and data messages. Accordingly, this factor may be taken into account when determining bandwidth for processing messages in each particular embodiment.

It should be noted that the foregoing components described herein and the associated functionality may be performed in hardware and/or software. The hardware queues may be implemented, for example, using a portion and type of RAM. Software may be used to manage the lock request and response messages. Hardware may be used to generate and send all flow control frames or messages. At a receiving node, hardware may receive the incoming data and control messages and then forward the incoming messages to software, for example, to manage and process the lock request and response messages.

In connection with the foregoing description, an embodiment may implement any one or more of a variety of different policies in connection with processing messages from the data and control queues. In one embodiment, a round-robin type of policy may be implemented such that, over time, the processing of messages from both queues approximates a Gaussian distribution. The foregoing techniques described herein may be implemented in an embodiment supporting the broadcast-based messaging protocol, or an equivalent.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method executed in a computer system for distributed lock management comprising:

determining, by a requesting node requesting a lock, a current lock owner of the lock in accordance with an indicator specifying which one or more nodes are available as lock owners; and sending a lock request message to said current lock owner; and wherein said requesting node waits for an indication as to whether the lock request message has been granted or denied, and said determining is performed by said requesting node prior to said sending for each request, and wherein, each time said lock is granted, an expiration time is determined indicating that said lock expires automatically when said expiration time is reached.

2. The method of claim 1, wherein said lock request message includes a time period indicated an amount of time for which said requesting node is requesting said lock.

3. The method of claim 2, further comprising performing, by said current lock owner:

receiving said lock request message;

determining whether said lock is currently granted to another node; and granting said lock to said requesting node if said lock is not currently granted to another node, and denying said lock to said requesting node otherwise.

4. The method of claim 3, further comprising performing, by said current lock owner:

adding said time period to a current time producing said expiration time, said expiration time being used in connection with a subsequent determination as to whether the lock is currently granted to a node.

5. The method of claim 4, further comprising performing, by said current lock owner:

comparing said current time to said expiration time to determine whether said lock is currently granted.

6. The method of claim 5, further comprising:

sending, by said current lock owner to said requesting node, a lock response message indicating whether said lock request message has been granted or denied.

7. The method of claim 6, further comprising:

determining, by said requesting node, that said lock request message has been denied if one of: no lock response message is received from said lock owner in accordance with a timeout condition, and a lock response message is received indicating that said lock request message has been denied.

8. The method of claim 7, wherein said requesting node is granted said lock until said expiration time is reached, said requesting node becomes unavailable, and said lock expires automatically when said expiration time is reached.

9. The method of claim 7, wherein said current lock owner becomes unavailable as a lock owner, and the method further comprises performing, by a second node:

determining a new current lock owner of the lock in accordance with an indicator specifying which one or more nodes are available as lock owners, said indicator indicating that said current lock owner is not available; and sending a lock request message to said new current lock owner, wherein said determining provides for dynamic reassignment of a new lock owner of said lock.

10. The method of claim 9, wherein said method is performed in a data storage system including a plurality of nodes, each of said plurality of nodes being a director in said data storage system.

11. The method of claim 10, wherein said lock is associated with a resource used by two or more nodes in said data storage system.

12. The method of claim 11, wherein said resource is a portion of global memory.

13. The method of claim 11, wherein each of said lock request message and said lock response message are sent using a message switch included in said data storage system.

14. The method of claim 13, wherein said lock request message and said lock response message are transmitted between nodes in said data storage system using portions of a message switch used in transmitting data messages.

15. The method of claim 10, wherein each of said plurality of nodes indicated as being available as a lock owner in accordance with said indicator is designated as a lock owner of a lock.

16. The method of claim 15, wherein any one of said plurality of nodes may request any lock, and wherein any one of said plurality of nodes may be designated as a lock owner of any lock in accordance with said indicator.

17. The method of claim 1, wherein said method is performed in a data storage system including a plurality of nodes, said plurality of nodes being directors that are endpoint in said data storage system, and said determining and said sending are performed by each of said plurality of nodes prior to sending a lock request message.

18. A method executed in a computer system for distributed lock management in a data storage system comprising:

determining, by a requesting node requesting a lock, a current lock owner of the lock in accordance with an indicator specifying which one or more nodes are available as lock owners; and sending a lock request message to said current lock owner, and wherein said determining is performed by said requesting node prior to said sending for each request and wherein, each time said lock is granted, an automatic expiration period is determined indicating when a current grant of said lock at said each time automatically expires.

19. The method of claim 18, wherein said data storage system includes a plurality of nodes which are processors, each of said plurality of nodes being an endpoint and being a lock owner as designated by said indicator when said each node is available as a lock holder.

20. The method of claim 18, wherein said lock request message includes a time period for which said requesting node is requesting said lock, and wherein said current lock owner determines said automatic expiration period for said lock using said time period.

21. The method of claim 20, wherein said current lock owner determines whether to grant or deny said lock request message in accordance with a current value for said automatic expiration period determined in accordance with a prior lock request message.

22. A data storage system comprising:

a plurality of processors which are endpoints in said data storage system;

a message switch used by said plurality of processors to send transmissions, said transmissions including a lock request message and a lock response message;

each of said plurality of processors including machine executable instructions on a computer readable medium for processing a lock request from said each processor to another processor that:

determines, prior to sending a lock request message, a current lock owner in accordance with an indicator specifying which one or more of said plurality of processors are available as lock owners; and sending said lock request message to said current lock owner; and each of said plurality of processors including machine executable instructions on a computer readable medium for processing a received lock request message when said each processor is indicated as a lock owner by said indicator of another processor that sent said received lock request message that:
  determines whether a requested lock in accordance with said received lock request message is currently granted;
  granting to said requested lock to a requesting processor if said requested lock is not currently granted, and otherwise denying said requested lock to said requested node, wherein said lock owner determines an automatic expiration time in accordance with a requested lock time included in said received lock request message.

23. A computer readable medium for distributed lock management including executable code stored thereon, the computer readable medium comprising:
  executable code that determines, by a requesting node requesting a lock, a current lock owner of the lock in accordance with an indicator specifying which one or more nodes are available as lock owners; and
  executable code that sends a lock request message to said current lock owner; and
wherein
  said requesting node waits for an indication as to whether the lock request message has been granted or denied, and said executable code that determines is executed by said requesting node prior to executing said executable code that sends for each request, and wherein, each time said lock is granted, an expiration time is determined indicating that said lock expires automatically when said expiration time is reached.

24. The computer readable medium of claim 23, wherein said lock request message includes a time period indicated an amount of time for which said requesting node is requesting said lock.

25. The computer readable medium of claim 24, further comprising executable code that performs, by said current lock owner:
  receiving said lock request message;
  determining whether said lock is currently granted to another node; and
  granting said lock to said requesting node if said lock is not currently granted to another node, and denying said lock to said requesting node otherwise.

26. The computer readable medium of claim 25, further comprising executable code that performs, by said current lock owner:
  adding said time period to a current time producing said expiration time, said expiration time being used in connection with a subsequent determination as to whether the lock is currently granted to a node.

27. The computer readable medium of claim 26, further comprising executable code that performs by said current lock owner:
  comparing said current time to said expiration time to determine whether said lock is currently granted.

28. The computer readable medium of claim 27, further comprising:
  executable code that sends, by said current lock owner to said requesting node, a lock response message indicating whether said lock request message has been granted or denied.

29. The computer readable medium of claim 28, further comprising:
  executable code that determines by said requesting node, that said lock request message has been denied if one of: no lock response message is received from said lock owner in accordance with a timeout condition, and a lock response message is received indicating that said lock request message has been denied.

30. The computer readable medium of claim 29, wherein said requesting node is granted said lock until said expiration time is reached, said requesting node becomes unavailable, and said lock expires automatically when said expiration time is reached.

31. The computer readable medium of claim 29, wherein said current lock owner becomes unavailable as a lock owner, and the computer program product further comprises executable code that performs, by a second node:
  determining a new current lock owner of the lock in accordance with an indicator specifying which one or more nodes are available as lock owners, said indicator indicating that said current lock owner is not available; and
  sending a lock request message to said new current lock owner, wherein said determining provides for dynamic reassignment of a new lock owner of said lock.

32. The computer readable medium of claim 31, wherein said distributed lock management is for a distributed lock management in a data storage system including a plurality of nodes, each of said plurality of nodes being a director in said data storage system.

33. The computer readable medium of claim 32, wherein said lock is associated with a resource used by two or more nodes in said data storage system.

34. The computer readable medium of claim 33, wherein said resource is a portion of global memory.

35. The computer readable medium of claim 33, wherein each of said lock request message and said lock response message are sent using a message switch included in said data storage system.

36. The computer readable medium of claim 35, wherein said lock request message and said lock response message are transmitted between nodes in said data storage system using portions of a message switch used in transmitting data messages.

37. The computer readable medium of claim 32, wherein each of said plurality of nodes indicated as being available as a lock owner in accordance with said indicator is designated as a lock owner of a lock.

38. The computer readable medium of claim 37, wherein any one of said plurality of nodes may request any lock, and wherein any one of said plurality of nodes may be designated as a lock owner of any lock in accordance with said indicator.

39. The computer readable medium of claim 23, wherein said distributed lock management is used in a data storage system including a plurality of nodes, said plurality of nodes being directors that are endpoint in said data storage system, and said executable code that determines and said executable code that sends are included in each of said plurality of nodes and executed prior to sending a lock request message.

40. A computer readable medium for distributed lock management in a data storage system including executable code stored thereon, the computer readable medium comprising:
  executable code that determines, by a requesting node requesting a lock, a current lock owner of the lock in accordance with an indicator specifying which one or more nodes are available as lock owners; and
  executable code that sends a lock request message to said current lock owner, and wherein said executable code that determines is executed by said requesting node prior to executing said executable code that sends for each request and wherein, each time said lock is granted, an automatic expiration period is determined indicating when a current grant of said lock at said each time automatically expires.

41. The computer readable medium of claim 40, wherein said data storage system includes a plurality of nodes which are processors, each of said plurality of nodes being an endpoint and being a lock owner as designated by said indicator when said each node is available as a lock holder.

42. The computer readable medium of claim 40, wherein said lock request message includes a time period for which said requesting node is requesting said lock, and wherein said current lock owner determines said automatic expiration period for said lock using said time period.

43. The computer readable medium of claim 42, wherein said current lock owner includes executable code that determines whether to grant or deny said lock request message in accordance with a current value for said automatic expiration period determined in accordance with a prior lock request message.

* * * * *